(12) United States Patent
Yamada

(10) Patent No.: US 7,301,295 B2
(45) Date of Patent: Nov. 27, 2007

(54) STABILIZER CONTROL DEVICE

(75) Inventor: Daisuke Yamada, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 11/505,868

(22) Filed: Aug. 18, 2006

(65) Prior Publication Data
US 2007/0040521 A1 Feb. 22, 2007

(30) Foreign Application Priority Data
Aug. 19, 2005 (JP) ............................. 2005-238778

(51) Int. Cl.
*H02P 11/00* (2006.01)
(52) U.S. Cl. .................. 318/275; 318/273; 318/274; 318/445; 280/5.511; 280/5.506
(58) Field of Classification Search ................ 318/275, 318/273, 274, 445; 280/5.511, 5.506
See application file for complete search history.

(56) References Cited

U.S. PATENT DOCUMENTS

| 6,425,585 B1 * | 7/2002 | Schuelke et al. ........ 280/5.511 |
| 7,129,659 B2 * | 10/2006 | Buma et al. ............. 318/432 |
| 7,237,785 B2 * | 7/2007 | Kraus et al. ........... 280/124.106 |
| 2005/0179220 A1 * | 8/2005 | Yasui et al. .............. 280/5.506 |
| 2005/0206100 A1 * | 9/2005 | Ohta et al. ............... 280/5.511 |

FOREIGN PATENT DOCUMENTS

| JP | 7-40849 | 2/1995 |
| JP | 8-228496 | 9/1996 |
| JP | 2000-71739 | 3/2000 |
| JP | 2002-518245 | 6/2002 |
| JP | 2005-33932 | 2/2005 |

* cited by examiner

*Primary Examiner*—Rita Leykin
(74) *Attorney, Agent, or Firm*—Buchanan Ingersoll & Rooney PC

(57) ABSTRACT

A stabilizer control device includes a stabilizer having torsion bars and a brushless motor having an exciting coil, a rotating direction switching device switching a rotating direction of the brushless motor, an excitation control device for controlling power supplied to the exciting coil, a vehicle state detecting device, a rotating state detecting device, a roll control device for reducing a rolling movement of the vehicle, a brake mode by which all the switching elements of one of the first switching element group and the second switching element group are controlled to be in a conducting state, and all the switching elements of the other of the first switching element group and the second switching element group are controlled to be in a non-conducting state; and a brake mode executing device for executing the brake mode in accordance with the state of the roll control device.

15 Claims, 7 Drawing Sheets

STABILIZER CONTROL DEVICE

CROSS REFERENCE TO RELATED APPLICATIONS

This application is based on and claims priority under 35 U.S.C. § 119 to Japanese Patent Application 2005-238778, filed on Aug. 19, 2005, the entire content of which is incorporated herein by reference.

FIELD OF THE INVENTION

The present invention relates to a stabilizer control device for a vehicle for variably controlling by means of a brushless motor a torsional force generated at a stabilizer provided between a right wheel and a left wheel.

BACKGROUND

Generally, a stabilizer control device for the vehicle applies an appropriate rolling moment to a vehicle body, while the vehicle is traveling and making a turn, by actuating a stabilizer so that the rolling movement of the vehicle body is reduced or controlled.

A device described in JP2000-71739A controls an effect of the stabilizer for changing an apparent torsional rigidity of the stabilizer by driving and controlling an actuator in accordance with a level of a turning that the vehicle makes. Specifically, a thrust of an electromagnetic linear actuator is calculated on the basis of signals outputted from sensors, and a target electric current value is set by converting the thrust into an electric current value. Thus, PID control is executed.

A stabilizer described in JP2002-518245A has halves of a stabilizer bar, a first stabilizer bar and a second stabilizer bar, and an electromechanical turning actuator that is provided between the first and second stabilizer bars. Specifically, the electromechanical turning actuator used for generating an initial stress torque is comprised of three basic elements; an electric motor, a reducing gear device and a brake. The brake is provided between the electric motor and the reducing gear device. In this configuration, the torque generated by the electric motor is converted by means of the reducing gear device into another torque required for generating for the initial stress for the stabilizer. The first stabilizer is supported by a bearing and directly connected to a housing of the electromechanical turning actuator, and the second separated stabilizer is also supported by a bearing and connected to the reducing gear device at an output end (high-torque end) thereof.

Various types of motors can be used for the electric motor provided at the actuator described in JP2002-518245A, however, a brushless motor is particularly suitable for driving the actuator.

According to a brushless motor described in JPH8-228496A, a phase switching signal pattern is switched by a phase switching control means in accordance with a change of an output that is outputted by a rotation sensor for detecting rotations of a motor shaft, a phase switching signal is outputted to the switching element from the phase switching control means in accordance with the phase switching signal pattern, and then electric current is supplied to an exciting coil by driving the switching element in accordance with the phase switching signal.

Further, according to another brushless motor described in JPH7-40849A, a motor brake pattern is set as a phase switching signal pattern. Such motor brake pattern is described as L, L, L, H, H, H, in which L means a low-level signal, and H means a high-level signal.

Furthermore, a motor control device described in JP2005-33932A executes, when a power supplied to the motor is stopped, a process in order to deal with a torque generated by the motor.

When the drive of AC motor is stopped, if a rotational speed of the AC motor inputted by an input means is greater than a first rotational speed, the motor control device controls all elements in the first switching element group or the second switching element group so as to be in a conducting state, and the motor control device controls all elements in the other of the first switching element group or the second switching element group so as to be in a non-conducting state.

On the other hand, if a rotational speed of the AC motor inputted by the input means is less than a second rotational speed, the motor control device controls all elements in the first switching element group and the second switching element group so as to be in a non-conducting state.

When the brushless motor described in JPH8-228496A is used for the actuator described in JP2002-518245A, an actual angle (or an actual torque) is controlled so as to be close to a target angle (or target torque) by switching the rotating direction of the motor without supplying power to the brushless motor. Thus, the stabilizer can be controlled.

However, it is confirmed that torque fluctuations (vibrations) are generated on the basis of a characteristic of the stabilizer control device when the rotating direction is switched. It is also confirmed that such fluctuations make noise.

Specifically, as shown in FIG. 9, a dashed line indicates a target angle, and a solid line indicates an actual angle. For example, when a value of the actual angle at a certain point becomes lower than a value of the target angle, a rotating direction of the motor is switched without supplying electric current to the brushless motor as shown in a middle section of FIG. 9, and then torque fluctuations (vibrations) are generated right after the rotating direction is switched to a counterclockwise direction (CCW), and such fluctuations make noise. In FIG. 9, CW indicates a clockwise direction rotation (right rotation), and CCW indicates a counterclockwise direction rotation (left rotation).

A need thus exists to provide a stabilizer control device, which has a brushless motor in order to control a torsional force generated at the stabilizer, wherein the rolling movement of the vehicle is appropriately reduced, and noise is reduced.

SUMMARY OF THE INVENTION

According to an aspect of the present invention, a stabilizer control device includes a stabilizer having a first torsion bar and a second torsion bar provided between a first wheel and a second wheel of a vehicle; and a brushless motor provided between the first torsion bar and the second torsion bar and having an exciting coil, the brushless motor rotating in accordance with an excited state of the exciting coil, a rotating direction switching device including a first switching element group and a second switching element group, which are connected to the brushless motor, the rotating direction switching device switching a rotating direction of the brushless motor by changing a pattern in which first switching elements of the first switching element group and the second switching elements of the second switching element group are controlled so as to be in a conducting state or a non-conducting state, an excitation control device for controlling power supplied to the exciting coil, a vehicle state detecting device for detecting a vehicle state including a traveling state of the vehicle and a steering state operated by an operator, a rotating state detecting device for detecting a rotating state of the brushless motor, a roll control device for reducing a rolling movement of the vehicle by controlling a torsional force generated at the stabilizer by controlling the rotating direction switching device and the excitation control device in accordance with the rotating state detected by the rotating state detecting device and the vehicle state detected by the vehicle state detecting device, a brake mode by which all the switching elements of one of the first switching element group and the second switching element group are controlled so as to be in a conducting state, and all the switching elements of the other of the first switching element group and the second switching element group are controlled so as to be in a non-conducting state, and a brake mode executing device for executing the brake mode in accordance with the controlling state of the roll control device.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
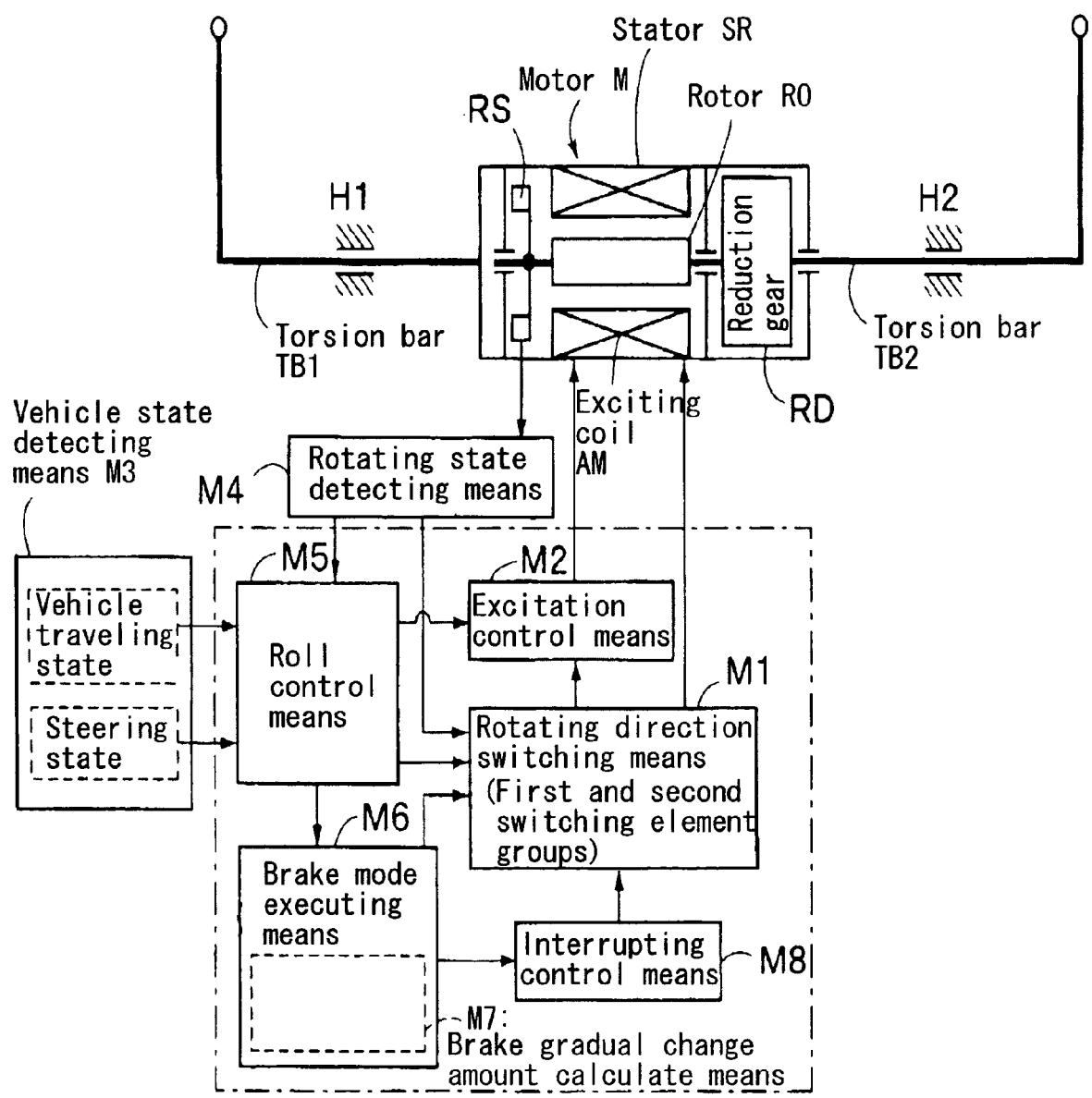
FIG. 1 illustrates a block diagram indicating a stabilizer control device according to an embodiment of the present invention.

An embodiment of the present invention will be explained in accordance with the attached drawings. FIG. 1 illustrates a diagram indicating a configuration of a stabilizer control device related to the embodiment of the present invention. The stabilizer control device includes torsion bars TB1 and TB2 and a brushless motor M (herein below referred to as a motor M). Specifically, the motor M includes a three-phase exciting coil AM, and the motor M rotates depending on an excited state of the exciting coil AM. In this embodiment, one end of the torsion bar TB1 is connected to a right suspension device (not shown), and one end of the torsion bar TB2 is connected to a left suspension device (not shown). The other end of the torsion bar TB2 is connected to a rotor RO of the motor M through a reduction gear RD, and the other end of the torsion bar TB1 is connected to a stator SR having the exciting coil AM.

The torsion bar TB1 is held at a vehicle body by a holding means H1, and the torsion bar TB2 is held at the vehicle body by a holding means H2. In this configuration, when power is supplied to the motor M, a torsion force is generated on each of the torsion bars TB1 and TB2, and then, because a torsional spring characteristic of the stabilizer is changed, roll stiffness of the vehicle body is controlled.

The stabilizer control device further includes a first switching element group and a second switching element group (corresponds to an inverter IV in FIG. 3), a rotating direction switching means M1 (e.g., referred to as a rotating direction switching device) and an excitation control means M2 (e.g., referred to as an exciting control device). The rotating direction switching means M1 switches a rotating direction of the motor M by controlling first switching elements of the first switching element group and second switching elements of the second switching element group so as to be in a conducting state or a non-conducting state. The excitation control means M2 supplies power to the exciting coil AM in accordance with the rotating direction of the motor M that is switched by the rotating direction switching means M1.

The stabilizer control device further includes a vehicle state detecting means M3 (e.g., referred to as a vehicle state detecting device), a rotating state detecting means M4 (e.g., referred to as a rotating state detecting device) and a roll control means M5 (e.g., referred to as a roll control device). Specifically, the vehicle state detecting means M3 detects a traveling state of the vehicle and a steering state operated by a driver, the rotating state detecting means M4 detects a rotating state of the motor M, and the roll control means M5 controls the rotating direction switching means M1 and the excitation control means M2 depending on the rotating state detected by the rotating state detecting means M4 and the vehicle state detected by the vehicle state detecting means M3. Thus, the roll control means M5 controls the torsional force generated at the stabilizer so as to reduce the rolling movement of the vehicle.

The stabilizer control device further includes a brake mode that controls all switching elements in the first switching element group and the second switching element group so as to be in a conducting state, at the same time, the brake mode also controls all switching elements in the other of the first switching element group and the second switching element group so as to be in a non-conducting state.

The stabilizer control device further includes a brake mode executing means M6 (e.g., referred to as a brake mode executing device), and in this embodiment, the brake mode executing means M6 includes the brake mode and executes it depending on the controlling state of the roll control means M5.

On the basis of an indicator that indicates a motion of the vehicle, a target torque or a target angle of the motor M can be set. The rotating state detecting means M4 detects an actual torque or an actual angle of the motor M, and in this embodiment, a rotation angle sensor RS provided within a stabilizer actuator FT configures the rotating state detecting means M4.

The brake mode executing means M6 determines whether or not the brake mode can be executed depending on a comparison result between the vehicle state detected by the vehicle state detecting means M3 and the rotating state detected by the rotating state detecting means M4.

Further, the brake mode executing means M6 includes a brake gradual change amount calculate means M7 (e.g., referred to as a brake gradual change amount calculating device) that calculates an operating time period of the brake mode in accordance with the comparison result between the vehicle state detected by the vehicle state detecting means M3 and the rotating state detected by the rotating state detecting means M4, and sets the operating time period to a brake gradual change amount.

Thus, the brake mode is executed on the basis of the brake gradual change amount. Alternatively, a deviation between the target indicator and the actual indicator, in other words, a deviation between the target angle and the actual angle, or a deviation between the target torque and the actual torque, can be used as the comparison result between the vehicle state detected by the vehicle state detecting means M3 and the rotating state detected by the rotating state detecting means M4.

Further, the roll control means M5 controls at a normal calculation cycle and at a high-speed calculation cycle, which is shorter than the normal calculation cycle, and the stabilizer control device further includes an interrupting control means M8 (e.g., referred to as an interrupting control device) for executing a brake mode in order to control at the high-speed calculation cycle.

Figure 2:
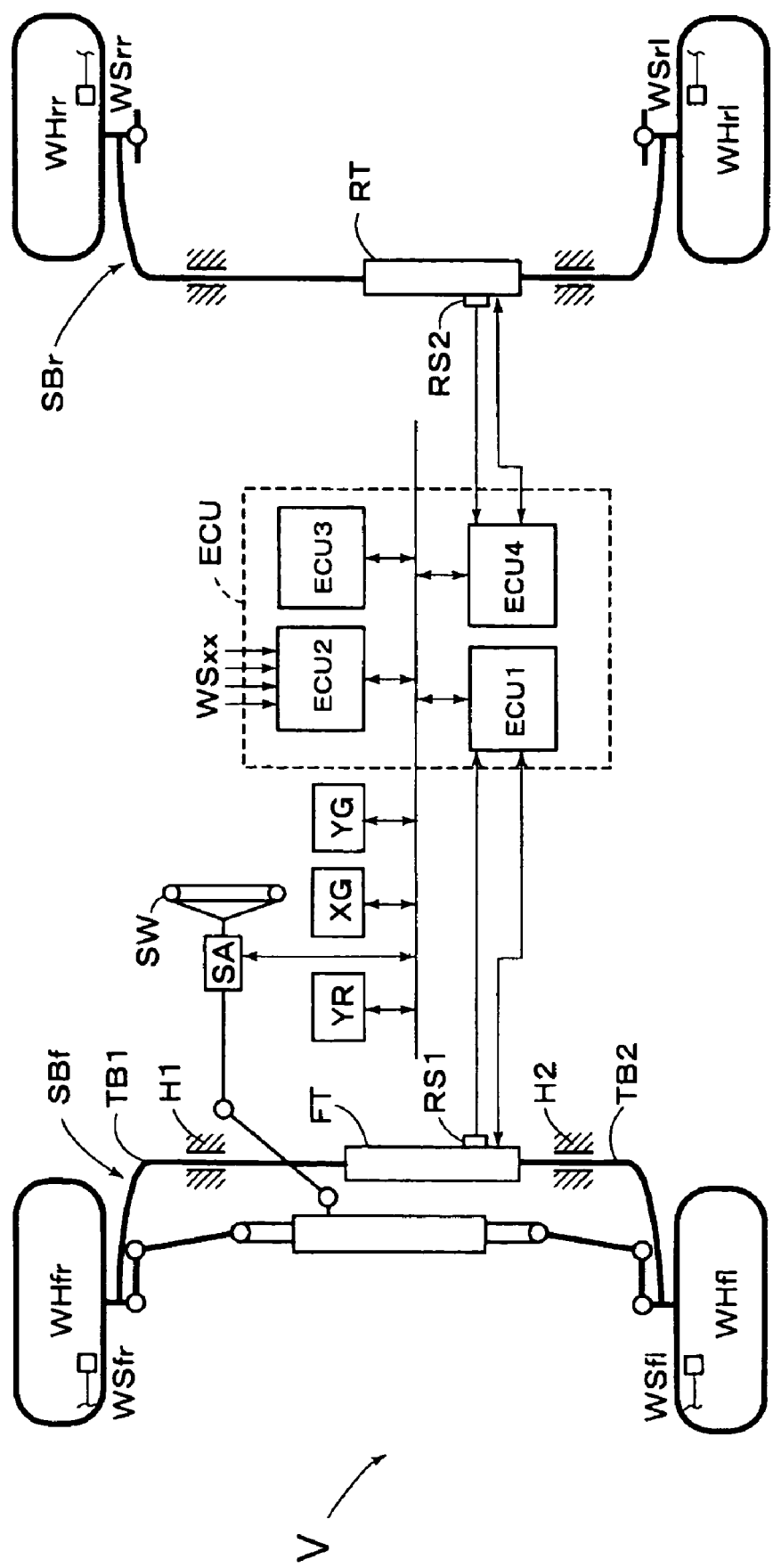
FIG. 2 illustrates a block diagram indicating an outline of a vehicle to which the stabilizer control device according to the embodiment of the present invention is provided.

FIG. 2 illustrates a schematic view indicating a vehicle to which the stabilizer control device according to the present invention is applied. Specifically the stabilizer control device configured as shown in FIG. 1 is applied to the vehicle, and a front wheel stabilizer SBf and a rear wheel stabilizer SBr, each of which works as a torsion spring when a movement in a roll direction is applied to a vehicle body (not shown), are provided at the vehicle.

The front wheel stabilizer SBf is configured in a manner where torsional rigidity generated thereat is variably controlled by means of a stabilizer actuator FT in order to reduce the vehicle body roll angle, which indicates the rolling movement of the vehicle body.

On the other hand, the rear wheel stabilizer SBr is configured in a manner where torsional rigidity generated thereat is variably controlled by means of a stabilizer actuator RT in order to reduce the vehicle body roll angle, which indicates the rolling movement of the vehicle body. Each of the stabilizer actuators FT and RT (hereinbelow referred to as an actuator) includes a motor M and a reduction gear RD as shown in FIG. 1, and each actuator is controlled by stabilizer control units ECU 1 and ECU 4.

As shown in FIG. 2, a vehicle speed sensor WSxx is provided at each wheel WHxx (xx indicates front-right (fr), front-left (fl), rear-right (rr) and rear-left (rl)). Each sensor is connected to the electronic control unit ECU and output a rotational speed detected at each wheel into the electronic control unit ECU. In other words, a pulse signal whose pulse number is in proportion relative to the wheel speed is outputted into the electronic control unit ECU.

Thus, a vehicle speed Vs is estimated on the basis of the wheel speed detected by each vehicle speed sensor WSxx. Further, a steering angle sensor SA for detecting a steering angle (steering wheel angle) δ of the steering wheel SW, a longitudinal acceleration sensor XG for detecting a vehicle longitudinal acceleration Gx, a lateral acceleration sensor YG for detecting a vehicle lateral acceleration Gy, a yaw rate sensor YR for detecting a vehicle yaw rate γ, and rotation angle sensors RS1 and RS2 for detecting rotational angles of the motors M are connected to the electronic control units ECU.

The electronic control unit ECU further includes a brake control unit ECU 2 and a steering control unit ECU 3 in addition to the stabilizer control units ECU 1 and ECU 4. Each control unit ECU 1 through 4 is connected to a communication bus by means of communication units (not shown) each of which includes communicative CPU, ROM and RAM. In this configuration, information that is used at each control system may be sent from other control systems.

Figure 3:
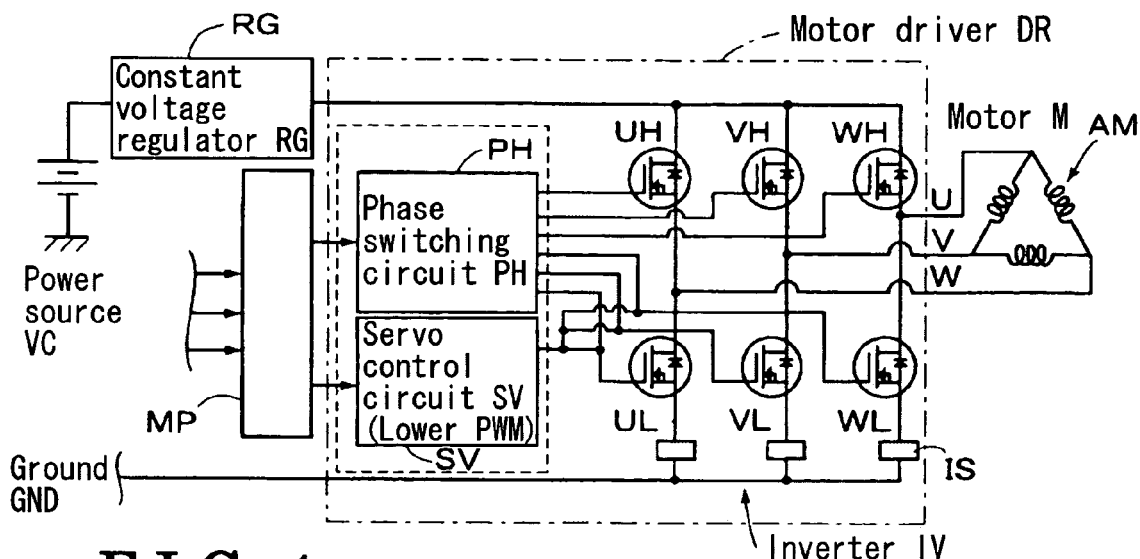
FIG. 3 illustrates a circuit diagram indicating a specific configuration of an exciting coil and a motor driver of a motor according to the embodiment of the present invention.

The stabilizer control units ECU 1 and ECU 4, the motor M and the motor driver for driving the motor M (indicated in a dashed line) are configured as shown in FIG. 3. The stabilizer control units ECU 1 and ECU 4 are actuated at constant voltage, and each of the stabilizer control units ECU 1 and ECU 4 includes a microprocessor MP having an interrupting terminal (not shown). The signals detected by the sensors are inputted into the microprocessor MP through an interface (not shown). A read only memory (ROM), a random access memory (RAM), a motor position counter and the like are housed in the microprocessor MP.

As shown in FIG. 3, the motor M is connected to the motor driver DR in a manner where an end of each end of the coils of the motor M is connected to the motor The motor driver DR includes a phase switching circuit PH and a servo control circuit SV, and when power is supplied by a power source VC through a constant voltage regulator RG, at which the power is controlled so as to be at a constant voltage, to the phase switching circuit PH and the servo control circuit SV, a phase switching signal group, which is an output signal of the microprocessor MP, and a pulse width modulation (PWM) signal, are input into the motor driver DR.

A phase switching signal for controlling a first (high-side) switching element group is inputted into a gate driving circuit (not shown), which drives first switching elements UH, VH and WH (configured of FET in this embodiment) so as to be turned on or off. Each switching element (FET) is connected to the motor M in a manner where power at high voltage is supplied by the power source VC to each terminal U, V and W of the motor M.

A phase switching signal for controlling a second (lower-side) switching element group is inputted into a gate driving circuit (not shown) which drives second switching elements UL, VL and WL (configured of FET in this embodiment) so as to be turned on or off. Then, the pulse width modulation (PWM) signal is outputted into the servo control circuit SV. Because of such configuration, the servo control circuit SV is also known as a lower PWM. Each switching element (FET) is provided between each terminal U, V and W and a ground GND, and a current sensor IS is provided at each terminal U, V and W at the side of the ground GND.

Thus, an inverter IV is formed within the motor driver DR by the switching element UH and the like. The inverter IV is controlled by the phase switching signal group and the pulse width modulation signal, and when the current flowing within the coils that configures the exciting coil AM is switched in synchronized with the rotation switching signal indicating a clockwise direction (CW) or a counterclockwise direction (CCW), the motor M is rotated.

Specifically, when a pattern of the phase switching signals is set as shown in Table 1, the motor M is rotated. A clockwise direction (CW) indicates a right rotation, and a counterclockwise direction (CCW) indicates a left rotation. The "1" in Table 1 indicates a conducting state of the switching element (FET), and the "0" in Table 1 indicates a non-conducting state of the switching element (FET).

TABLE 1

| | | FET | | | | | |
|---|---|---|---|---|---|---|---|
| Inverter | | UH | VH | WH | UL | VL | WL |
| Control mode | CW | 1 | 0 | 0 | 0 | 1 | 0 |
| | | 1 | 0 | 0 | 0 | 0 | 1 |
| | | 0 | 1 | 0 | 0 | 0 | 1 |
| | | 0 | 1 | 0 | 1 | 0 | 0 |
| | | 0 | 0 | 1 | 1 | 0 | 0 |
| | | 0 | 0 | 1 | 0 | 1 | 0 |
| | CCW | 1 | 0 | 0 | 0 | 0 | 1 |
| | | 1 | 0 | 0 | 0 | 1 | 0 |
| | | 0 | 0 | 1 | 0 | 1 | 0 |
| | | 0 | 0 | 1 | 1 | 0 | 0 |
| | | 0 | 1 | 0 | 1 | 0 | 0 |
| | | 0 | 1 | 0 | 0 | 0 | 1 |
| Brake mode | | 1 | 1 | 1 | 0 | 0 | 0 |
| Stop mode | | 0 | 0 | 0 | 0 | 0 | 0 |

For example, when the phase switching signals are output in a pattern such as (UH, VH, WH, UL, VL, WL)=(1, 0, 0, 0, 1, 0) in the control mode of Table 1, the motor M is rotated in a clockwise direction at 30 degrees. Then, in accordance with the rotation, the phase switching signals are switched to (UH, VH, WH, UL, VL, WL)=(1, 0, 0, 0, 0, 1), and the motor M is further rotated in a clockwise direction at 30 degrees. Thus, the motor M is continuously rotated.

In order to apply a rotation of a clockwise direction (CW) to the motor M, the pattern of the phase switching signal is switched in accordance with the patterns indicated in the upper column of Table 1. On the other hand, in order to apply a rotation of a counterclockwise direction (CCW) to the motor M, the pattern of the phase switching signal is switched in accordance with the patterns indicated in the lower column of Table 1. The pattern of the brake mode indicated in Table 1 will be explained later. At the stop mode indicated in Table 1, the control is end, and all switching elements (FET) are turned off.

Patterns of the phase switching signals at a standby mode are indicated in Table 2. At the standby mode, a duty becomes zero, and only one switching element (FET) is turned on ("1") as shown in Table 2.

TABLE 2

| | | FET | | | | | |
|---|---|---|---|---|---|---|---|
| Inverter | | UH | VH | WH | UL | VL | WL |
| Standby mode | CW | 1 | 0 | 0 | 0 | 0 | 0 |
| | | 1 | 0 | 0 | 0 | 0 | 0 |
| | | 0 | 1 | 0 | 0 | 0 | 0 |
| | | 0 | 1 | 0 | 0 | 0 | 0 |
| | | 0 | 0 | 1 | 0 | 0 | 0 |
| | | 0 | 0 | 1 | 0 | 0 | 0 |
| | CCW | 1 | 0 | 0 | 0 | 0 | 0 |
| | | 1 | 0 | 0 | 0 | 0 | 0 |
| | | 0 | 0 | 1 | 0 | 0 | 0 |
| | | 0 | 0 | 1 | 0 | 0 | 0 |
| | | 0 | 1 | 0 | 0 | 0 | 0 |
| | | 0 | 1 | 0 | 0 | 0 | 0 |

Figure 4:
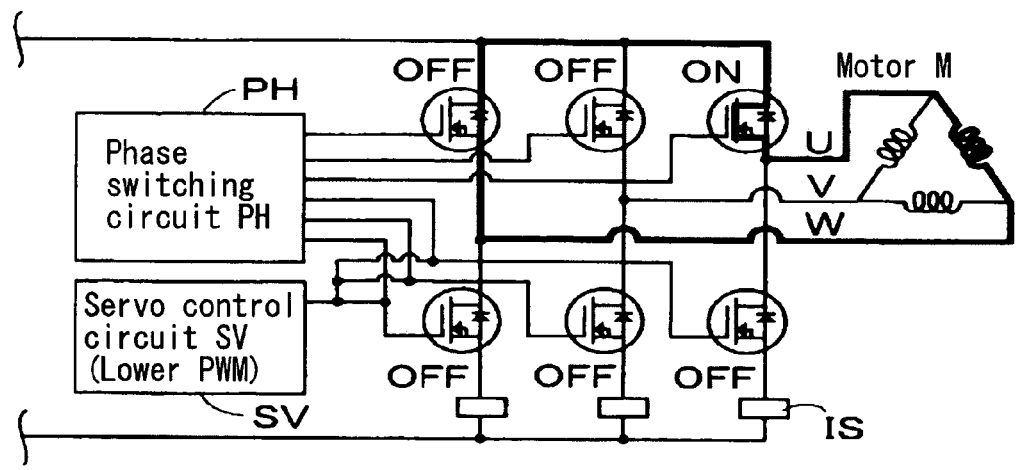
FIG. 4 illustrates a circuit diagram indicating a condition of the exciting coil when a duty is zero according to the embodiment of the present invention.

Thus, even when the duty becomes zero, in other words, power is not supplied to the motor M; a closed circuit indicated by a bold solid line in FIG. 4 is formed. However, as indicated at a central section in FIG. 9, when the rotating direction of the motor M is switched, for example, the rotation of the motor M is switched to a counterclockwise direction, by use of a torsional force of the torsion bars TB1 and TB2, an actual angle (an actual torque) is controlled so as to be close to a target angle (a target torque).

Figure 9:
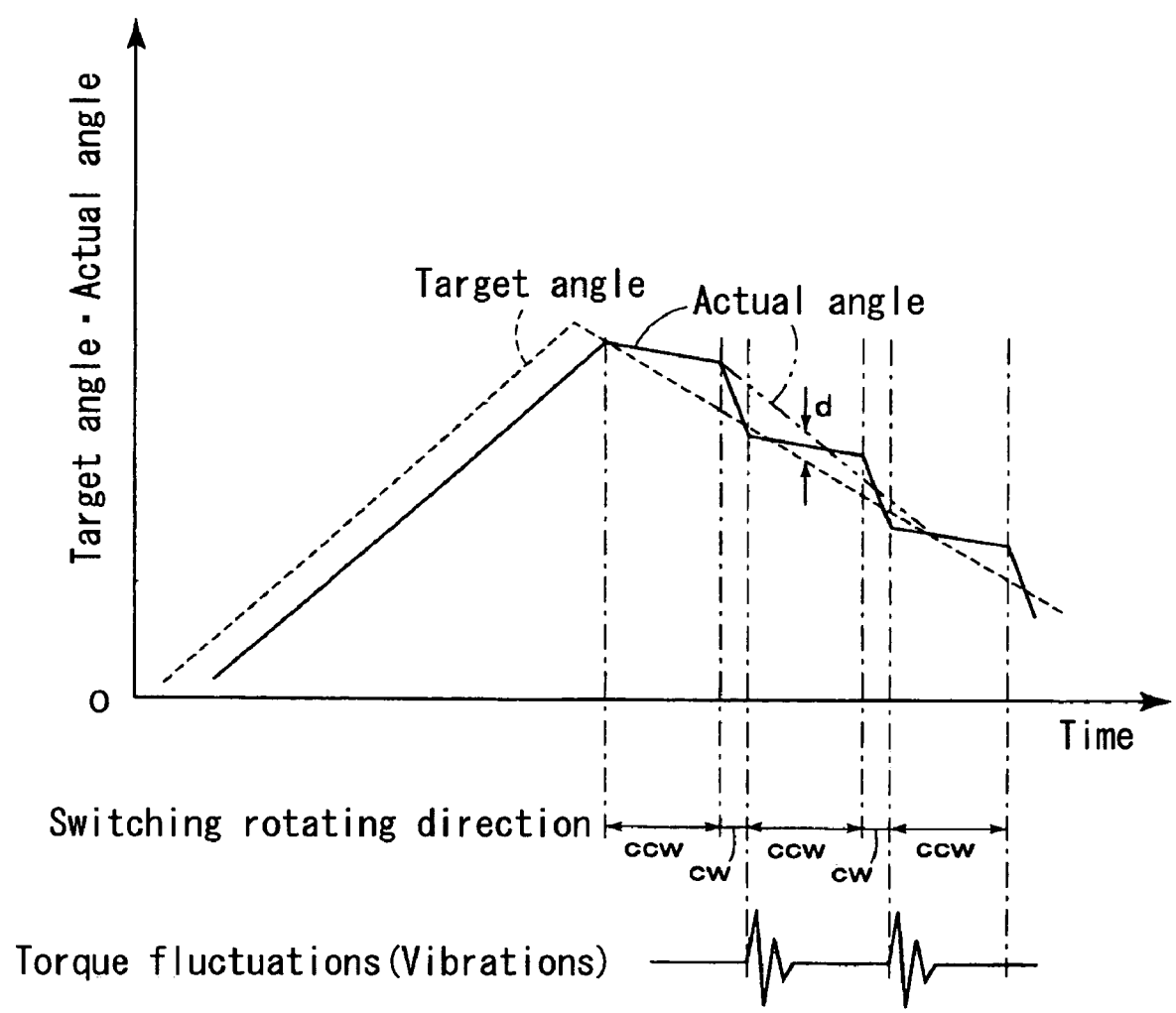
FIG. 9 illustrates a graph indicating examples of the stabilizer control according to the prior art and the present invention.

In this configuration, as shown in the lower section of FIG. 9, torque fluctuations (vibrations) are generated right after the rotation is switched to a counterclockwise direction (CCW). In condition illustrated in FIG. 4, because of the torsional forces of the torsion bars TB1 and TB2, a counter electromotive force is generated at the motor M, and as the voltage at the motor M is increased, regenerative electric current returns to the power source VC.

Figure 5:
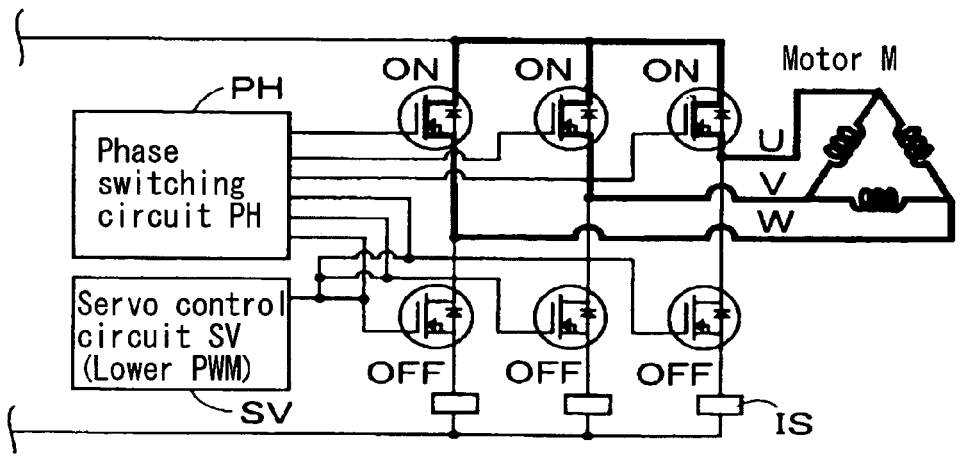
FIG. 5 illustrates a circuit diagram indicating a condition of the exciting coil at a brake mode according to the embodiment of the present invention.

In this embodiment, a brake mode is set as shown in Table 1 in order to form a closed circuit indicated by a bold solid line in FIG. 5. At the brake mode, the actual angle is also controlled so as to be close to the target angle. Specifically, at the brake mode, the actual angle is controlled so as not to be below the target angle as indicated by a chain double-dashed line in FIG. 9.

More specifically, the actual angle is controlled so as to gradually reduce to come close to the target angle. This control to gradual change will be explained later. "ON" in FIG. 4 and FIG. 5 indicates a conducting state of each switching element (FET), and "OFF" in FIG. 4 and FIG. 5 indicates a non-conducting state of each switching element (FET).

Figure 6:
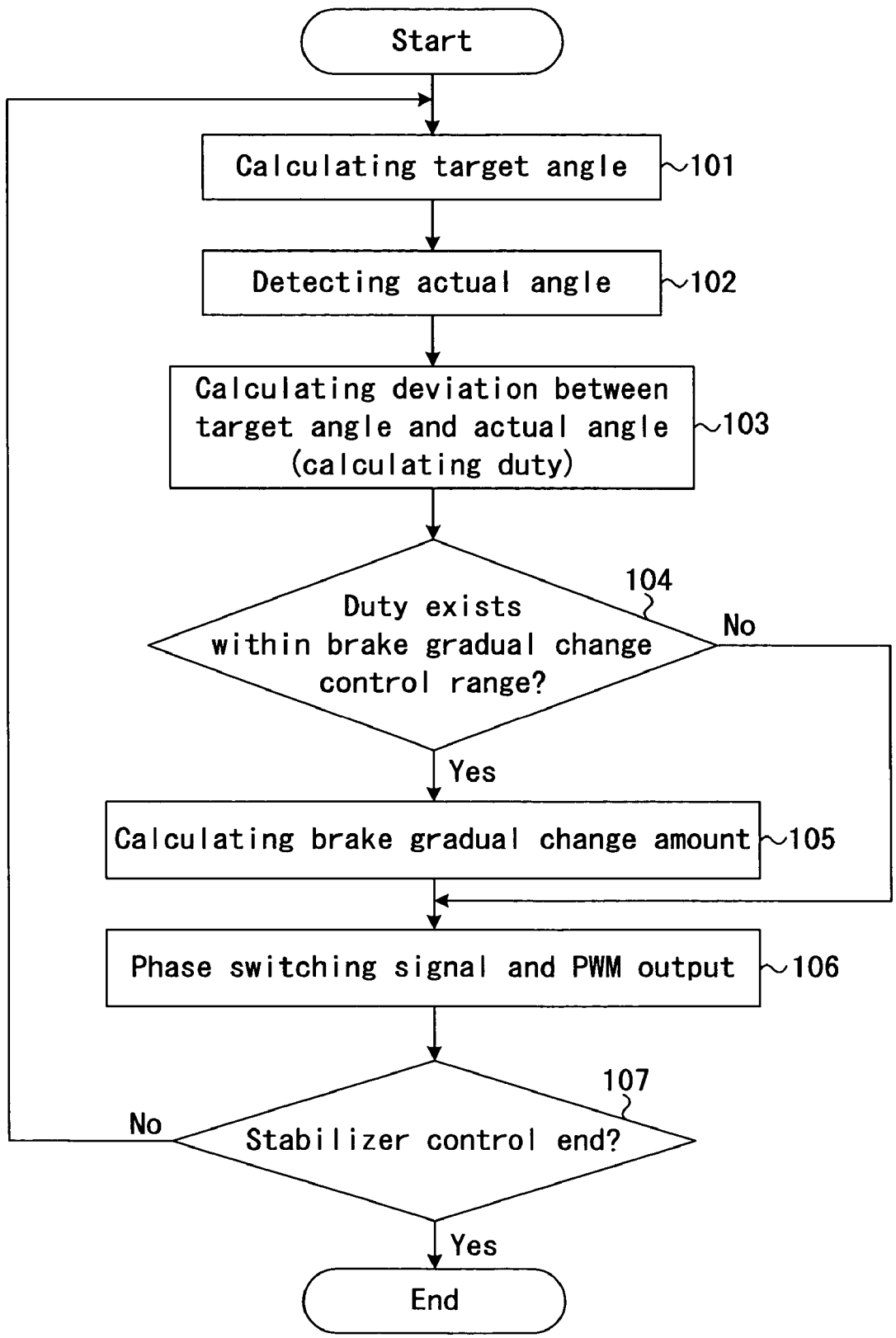
FIG. 6 illustrates a flowchart indicating an example of a stabilizer control according to the embodiment of the present invention.

FIG. 6 illustrates a flow chart indicating an example of a stabilizer control. In Step 101, a target angle is calculated, and the process goes to Step 102. In Step 102, an actual angle of the motor M is detected by calculating a total of step numbers of the motor M, and then the process goes to Step 103. In Step 103, a deviation between the target angle and the actual angle is calculated, and a duty is calculated on the basis of an absolute value of the deviation. Then, the process goes to Step 104. In Step 104, it is determined whether or not the brake mode will be executed. For example, it is determined whether or not the duty exists within a brake gradual change control range by comparing an absolute value of the target angle and an absolute value of the actual angle, and if it is determined that the duty exists within the brake gradual change control range when the absolute value of the actual angle is greater than the absolute value of the target angle.

When it is detected in Step 104 that the duty exists within the brake gradual change control range, the process goes to Step 105. In Step 105, a brake gradual change amount (brake mode operating time period) is calculated on the basis of a level of the deviation between the absolute value of the target angle and the absolute value of the actual angle.

For example, when a maximum value of the deviation between the absolute value of the target angle and the absolute value of the actual angle is preset, and the deviation between the absolute value of the target angle and the absolute value of the actual angle is approximately 25% relative to the maximum value, a value corresponding to 75% of the maximum value is set to a brake gradual change amount. For example, when the maximum value is preset to a timer value 4, a timer value 3 is set to the brake gradual change amount.

The relationship between the deviation and brake gradual change amount is indicated in a graph of FIG. 9. In FIG. 9, the target angle is indicated by a dashed line, the actual angle is indicated by a chain double-dashed line and the deviation between the target angle and the actual angle is indicated by "d". As shown in the graph in FIG. 9, when the deviation d is large, the brake gradual change amount is small, and when the deviation d is small, the brake gradual change amount is large.

The process goes to Step 106. In Step 106, phase switching signal and a PWM control signal sent to the motor M is calculated. On the basis of the phase switching signal and the PWM control signal, the motor M is controlled so that the stabilizer control is executed appropriately. For example, the actual angle is controlled so as to be in the chain double-dashed line in FIG. 9.

The process goes to Step 107. In Step 107, it is determined whether or not the process of the stabilizer control is finished. Specifically, while the stabilizer control has been executed, the process goes back to Step 101, and the above processes are repeated. In Step 104, when it is determined that the duty does not exist within the brake gradual change control range, the brake gradual change amount is not calculated and the process goes to Step 106. In Step 106, a phase switching signal and a PWM control signal corresponding to the status at that time are outputted.

Figure 7:
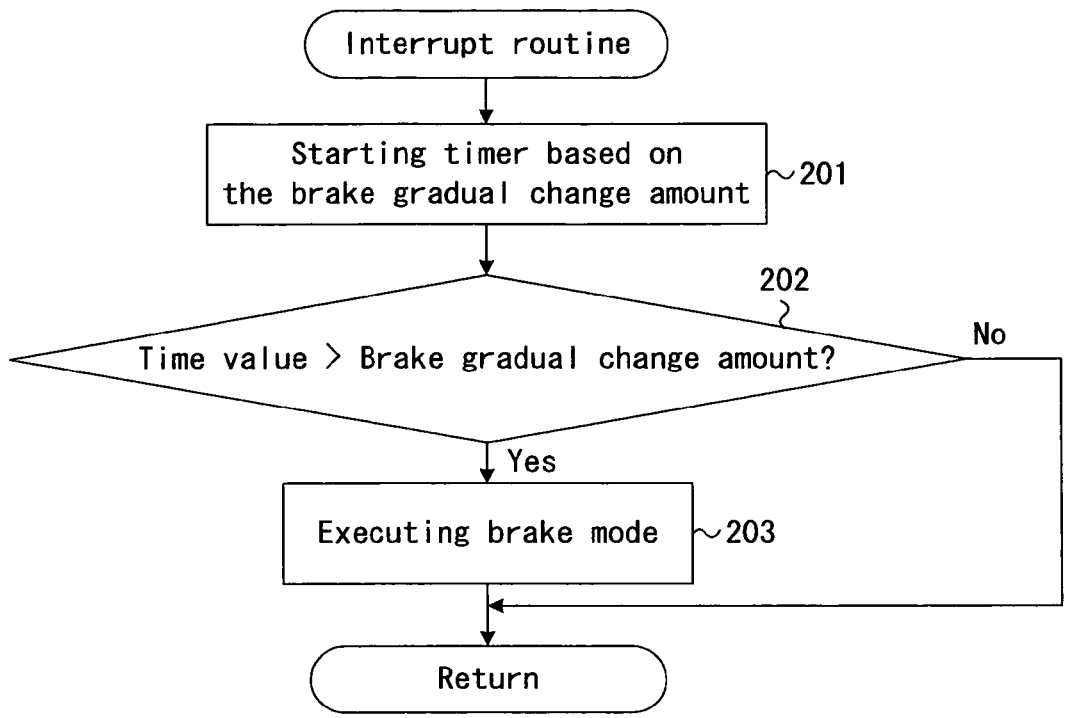
FIG. 7 illustrates a flowchart indicating an example of an interrupting control according to the embodiment of the present invention.

FIG. 7 illustrates an interrupt routine. The main routine illustrated in FIG. 6 is executed at a normal operating cycle (e.g., operating cycle 8 ms), however, the interrupt routine is executed at a high-speed operating cycle (e.g., operating cycle 300 μs). The interrupt routine is executed on the basis of an interrupt signal. In Step 201, a timer (not shown) is started on the basis of the brake gradual change amount calculated in Step 105. The process goes to Step 202. In Step 202, the brake gradual change amount compares to the timer value. If the timer value is greater than the brake gradual change amount, the process goes to Step 203. In Step 203, and the braking mode is executed.

Figure 8:
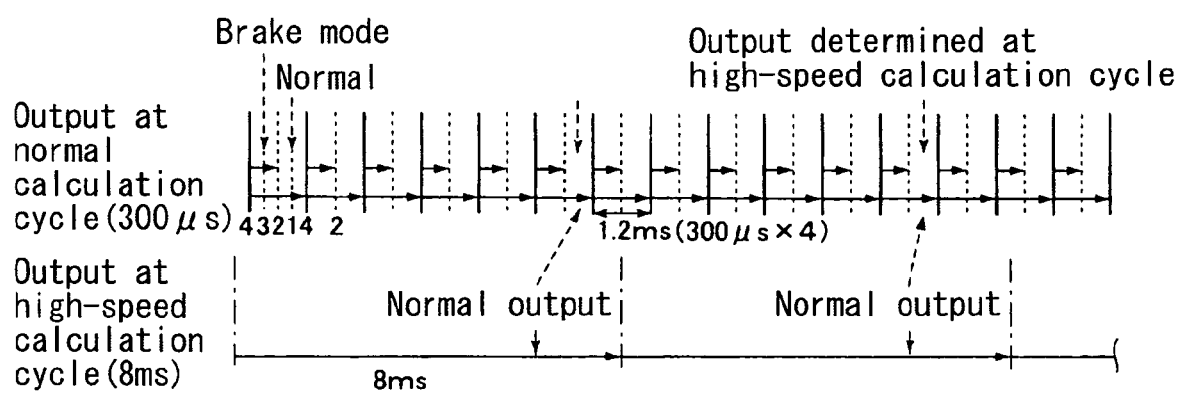
FIG. 8 illustrates a time chart indicating a relationship between a normal control and an interrupting control according to the embodiment of the present invention.

Drawing illustrated in FIG. 8 indicates an example of a relationship between a control at a high-speed calculation cycle (interrupt routine) and a control at a normal calculation cycle (main routine). In this example, the high-speed calculation cycle is divided into four parts, and a timer value "4" is preset to a maximum value of the brake gradual change amount (operating time period of the brake mode), and "2" (50% of the maximum value) is set to the brake gradual change amount. Thus, the brake mode is repeated at intervals of 1.2 ms (=300 μs×4). Because the actual angle is controlled as shown in a chain double-dashed line in FIG. 9, generation of the torque fluctuations (vibration) caused by the drive of the motor M can be reduced.

The abovementioned controls according to the present invention can be applied to any other device whose brushless motor and an attached member show a relationship illustrated by the solid line and the dashed line in FIG. 9, and torque fluctuations (vibrations) have been generated on the basis of such relationship. Specifically, the present invention can be applied to a motor control device illustrated in FIG. 10.

Figure 10:
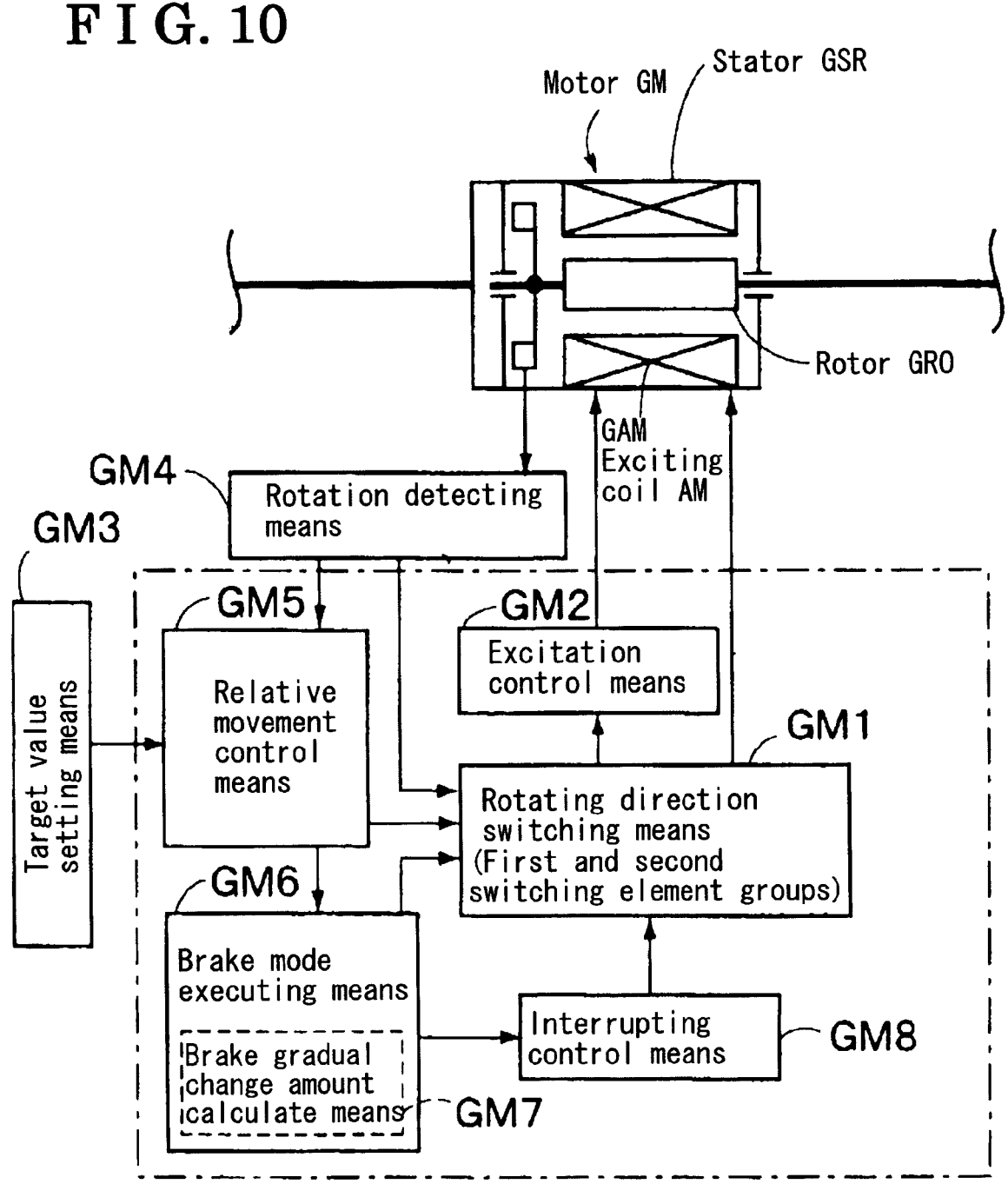
FIG. 10 illustrates a block diagram indicating a motor control device to which the present invention is applied.

The motor control device shown in FIG. 10 includes a stator GSR, a brushless motor GM, a first switching element group and a second switching element group. Specifically, the stator GSR includes a three-phase exciting coil GAM, the brushless motor GM includes a rotor GRO rotating in accordance with an excited state of the stator GSR, and the first switching element group and the second switching element group are connected to the stator GSR.

The motor control device further includes a rotating direction switching means GM1, an excitation control means GM2, a target value setting means GM3, a rotation detecting means GM4 and a relative movement control means GM5. Specifically, the rotating direction switching means GM1 switches the rotating direction of the rotor GRO by controlling the switching elements of the first and the second switching element groups so as to be in a conducting state or a non-conducting state.

The excitation control means GM2 supplies power to the exciting coil GAM in accordance with the rotating direction of the rotor GRO whose rotating direction is switched by the rotating direction switching means GM1. The target value setting means GM3 setting a target rotation indicator of the rotor GRO, the rotation detecting means GM4 detects an actual rotation indicator of the rotor GRO. The relative movement control means GM5 controls the rotating direction switching means GM1 and the excitation control means GM2 in accordance with the target rotation indicator and the actual rotation indicator in order to control a relative movement between the rotor GRO and the stator GSR.

The motor control device executes a brake mode by which all of the first switching elements of the first switching element group is controlled so as to be in a conducting state, and all of the second switching elements of the second switching element group are controlled so as to be in a non-conducting state; or all of the first switching elements of the first switching element group are controlled so as to be in a non-conducting state, and all of the second switching elements of the second switching element group is controlled so as to be in a conducting state.

The motor control device further includes a brake mode executing means GM6 for executing the brake mode on the basis of the controlling state controlled by the relative movement control means GM5; especially, the brake mode executing means GM6 determines whether or not the brake mode can be executed on the basis of a deviation between the target rotation indicator and the actual rotation indicator.

The brake mode executing means GM6 includes a brake gradual change amount calculate means GM7 for calculating an operating time period of the brake mode in accordance with the deviation between the target rotation indicator and the actual rotation indicator and set the operating time period to the brake gradual change amount. In this configuration, the brake mode is executed on the basis of the brake gradual change amount calculated by the brake gradual change amount calculate means GM7.

The relative movement control means GM5 controls at a normal calculation cycle and at a high-speed calculation cycle, which is higher than the normal calculation cycle, and the stabilizer device further includes an interrupting control means GM8 for executing the brake mode in order to control at the high-speed calculation cycle.

For indicators indicating a vehicle state detected by the vehicle traveling state detecting device, a vehicle speed, lateral speed, a yaw rate, a roll angle and a roll rate can be used. For indicators indicating the operating state of the wheel, a steering wheel angle and a steering operation speed can be used. On the basis of the indicators indicating the vehicle traveling state a target torque and a target angle of the brushless motor are set to the target indicators. For the rotating state, detected by the rotating state detecting device, an actual indicators set by detecting an actual torque and an actual angle generated at the brushless motor are used.

Thus, it is determined whether or not the brake mode will be executed on the basis of a deviation between a target indicator and an actual indicator, specifically, a deviation between a target angle and an actual angle, or a deviation between a target torque and an actual torque.

Thus, the operating time period of the brake mode is calculated on the basis of a deviation between a target indicator and an actual indicator, specifically, a deviation between a target angle and an actual angle, or a deviation between a target torque and an actual torque.

According to the stabilizer control device of the present invention, because the brake mode is executed on the basis of the controlling state of the roll control device, noise can be reduced, and the vehicle rolling movement of the vehicle can be reduced smoothly and appropriately.

According to the stabilizer control device of the present invention, the brake mode executing device determines whether or not the brake mode will be executed on the basis of the comparison result between the vehicle state detected by the vehicle state detecting device and the rotating state detected by the rotating state detecting device. According to the stabilizer control device of the present invention, the brake gradual change amount can be set appropriately on the basis of the comparison result between the vehicle state detected by the vehicle state detecting device and the rotating state detected by the rotating state detecting device.

According to the stabilizer control device of the present invention, because the interrupting control device is provided, the brake mode can be executed at an appropriate brake gradual change amount.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A stabilizer control device comprising:
   a stabilizer including:
      a first torsion bar and a second torsion bar provided between a first wheel and a second wheel of a vehicle; and a brushless motor provided between the first torsion bar and the second torsion bar and having an exciting coil, the brushless motor rotating in accordance with an excited state of the exciting coil;
   a rotating direction switching device including a first switching element group and a second switching element group, which are connected to the brushless motor, the rotating direction switching device switching a rotating direction of the brushless motor by changing a pattern in which first switching elements of the first switching element group and the second switching elements of the second switching element group are controlled so as to be in a conducting state or a non-conducting state;
   an excitation control device for controlling power supplied to the exciting coil;
   a vehicle state detecting device for detecting a vehicle state including a traveling state of the vehicle and a steering state operated by an operator;
   a rotating state detecting device for detecting a rotating state of the brushless motor;
   a roll control device for reducing a rolling movement of the vehicle by controlling a torsional force generated at the stabilizer by controlling the rotating direction switching device and the excitation control device in accordance with the rotating state detected by the rotating state detecting device and the vehicle state detected by the vehicle state detecting device;
   a brake mode by which all the switching elements of one of the first switching element group and the second switching element group are controlled so as to be in a conducting state, and all the switching elements of the other of the first switching element group and the second switching element group are controlled so as to be in a non-conducting state; and
   a brake mode executing device for executing the brake mode in accordance with the controlling state of the roll control device.

2. The stabilizer control device according to claim 1, wherein the brake mode executing device determines, in accordance with a comparison result between the vehicle state detected by the vehicle state detecting device and the rotating state detected by the rotating state detecting device, a necessity for performing the brake mode.

3. The stabilizer control device according to claim 2, wherein the brake mode executing device includes a brake gradual change amount calculating device for calculating an operating time period on the basis of the comparison result between the vehicle state detected by the vehicle state detecting device and the rotating state detected by the rotating state detecting device and setting the operating time period to a brake gradual change amount, and the brake mode executing device executes the brake mode on the basis of the brake gradual change amount calculated by the brake gradual change amount calculating device.

4. The stabilizer control device according to claim 3, wherein the roll control device controls at a normal calculation cycle and at a high-speed calculation cycle, which is shorter than the normal calculation cycle, and the stabilizer control device further includes an interrupting control device that executes the brake mode in order to control at the high-speed calculation cycle.

5. The stabilizer control device according to claim 2, wherein, in order to reduce a roll angle of the vehicle, the brake mode executing device calculates a target angle of the brushless motor on the basis of the vehicle state detected by the vehicle state detecting device, and the brake mode executing device determines whether or not the brake mode will be executed on the basis of a deviation between the target angle and an actual angle of the brushless motor.

6. The stabilizer control device according to claim 3, wherein, in order to reduce a roll angle of the vehicle, the brake mode executing device calculates a target angle of the brushless motor on the basis of the vehicle state detected by the vehicle state detecting device, and the brake mode executing device determines whether or not the brake mode will be executed on the basis of a deviation between the target angle and an actual angle of the brushless motor.

7. The stabilizer control device according to claim 4, wherein, in order to reduce a roll angle of the vehicle, the brake mode executing device calculates a target angle of the brushless motor on the basis of the vehicle state detected by the vehicle state detecting device, and the brake mode executing device determines whether or not the brake mode will be executed on the basis of a deviation between the target angle and an actual angle of the brushless motor.

8. The stabilizer control device according to claim 1, wherein the first switching element group is connected to a power source, and the second switching element group is connected to a ground.

9. The stabilizer control device according to claim 2, wherein the first switching element group is connected to a power source, and the second switching element group is connected to a ground.

10. The stabilizer control device according to claim 3, wherein the first switching element group is connected to a power source, and the second switching element group is connected to a ground.

11. The stabilizer control device according to claim 4, wherein the first switching element group is connected to a power source, and the second switching element group is connected to a ground.

12. The stabilizer control device according to claim 8, wherein the stabilizer control device further includes a servo control circuit that turns on and off the second switching element group.

13. The stabilizer control device according to claim 9, wherein the stabilizer control device further includes a servo control circuit that turns on and off the second switching element group.

14. The stabilizer control device according to claim 10, wherein the stabilizer control device further includes a servo control circuit that turns on and off the second switching element group.

15. The stabilizer control device according to claim 11, wherein the stabilizer control device further includes a servo control circuit that turns on and off the second switching element group.

* * * * *